United States Patent [19]

Dawans et al.

[11] 4,028,432

[45] June 7, 1977

[54] PROCESS FOR MANUFACTURING FLEXIBLE EPOXIDE RESINS

[75] Inventors: Francois Dawans, Bougival; Jean-Pierre Durand, Chatou, both of France

[73] Assignee: Institut Francais du Petrole, Rueil-Malmaison, France

[22] Filed: Mar. 27, 1975

[21] Appl. No.: 562,846

[30] Foreign Application Priority Data

Mar. 29, 1974 France ............................... 74.11256

[52] U.S. Cl. .......................... 260/836; 260/837 R
[51] Int. Cl.$^2$ ......................................... C08L 63/10
[58] Field of Search ....................... 260/836, 837 R

[56] References Cited

UNITED STATES PATENTS

| | | | |
|---|---|---|---|
| 3,113,036 | 12/1963 | Schwarzer | 260/836 |
| 3,639,500 | 2/1972 | Muny | 260/837 R |
| 3,671,477 | 6/1972 | Nesbitt | 260/836 |
| 3,673,274 | 6/1972 | Tomalia | 260/836 |
| 3,853,815 | 12/1974 | Lubowitz | 260/836 |

OTHER PUBLICATIONS

Lee & Neville, "Handbook of Epoxy Resins," McGraw-Hill, 1967, New York, pp. 11-17 to 11-23 and 12-2 to 12-15.

*Primary Examiner*—Paul R. Michl
*Attorney, Agent, or Firm*—Millen & White

[57] ABSTRACT

Epoxide resins of improved flexibility are obtained by partially substituting a conventional cross-linking agent with liquid polybutadiene containing carboxy groups. Specifically a liquid epoxide resin is reacted with a carboxylic compound and polybutadiene having carboxylic substitution.

10 Claims, No Drawings

PROCESS FOR MANUFACTURING FLEXIBLE EPOXIDE RESINS

The invention concerns a new process for manufacturing flexible epoxide resins and the resulting epoxide resins.

According to the prior art, it has been proposed to confer flexibility to compositions of solid epoxide resins by using either relatively costly co-monomers, or plasticizers which migrate in the course of time.

It has also been proposed to use so-called telechelic polymeric products, for example, in the French Pat. No. 2,074,043 or in the German Application DOS No. 2,118,333, which describe the use of 1,3-butadiene polymers or copolymers of 1,3-butadiene with acrylonitrile, these polymers or copolymers being characterized as comprisng hydroxy, carboxy or mercaptan groups located essentially at the two ends of the chains. Further to the fact that this type of polymer is not readily available, it appears that the incorporation of telechelic polymers into a formulation of epoxide resin results in substantial decrease in the resistance to thermal deformation of the final product, thereby limiting its range of usefulness.

The object of the present invention is to provide a new process for preparing solid epoxide resins, which results in a material which can be processed according to conventional techniques and has both good flexibility at low temperature and good thermal resistance. It has been found that these results could be obtained by replacing part of the conventional acid or anhydride hardening agent by polybutadiene liquid at room temperature and comprising more than 2 carboxy groups per polymeric chain, these carboxy groups being statistically distributed along the chain.

According to the invention, compositions of solid and flexible epoxide resins are prepared by reacting in any order:

A. an epoxide resin liquid at room temperature and whose molecule contains more than one 1,2-epoxide group, B. a saturated or unsaturated aliphatic or cycloaliphatic, or aromatic compound having carboxylic acid and/or carboxylic anhydride radicals and whose molecule contains more than one carboxy radical, and C. polybutadiene having caboxylic acid and/or carboxylic anhydride radicals and whose macromolecule contains 3–25 and preferably 4–12 carboxy radicals per each 100 butadiene units, the relative proportions of the components (A) and (B+C) being so selected that the ratio of the epoxide equivalents to the caboxy equivalents ranges from 0.5:1 to 1.5:1, and the proportion of the components (C) represents 2–15% and preferably 4–10% of the carboxy equivalents.

The preferred embodiment of the invention consists of simultaneously reacting the liquid epoxide resin (A), the carboxy radical containing compound (B) and the carboxy radical containing polybutadiene (C) at a temperature of 90°–250° C, for at least 30 minutes, for example for 30 minutes to 5 hours. According to a particular preferred embodiment, the termal treatment is conducted by heating the whole to about 100° C for at least 1 hour, for example 2 hours, then to about 200° C, for at least 1 hour, for example 2 hours.

The liquid epoxide resins which may be used in the process of the invention are specially aromatic epoxide resins of the general formula:

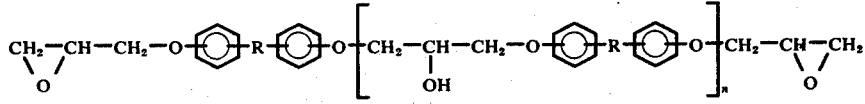

where R is a bivalent aliphatic radical of 1-6 carbon atoms or one of the radicals:

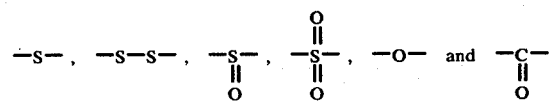

and $n$ has an average value from 0 to about 2.

The preferred epoxide component (A) is a bisphenol A di-glycidyl ether of the formula:

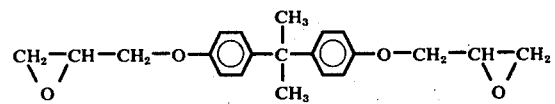

Maleic, phthalic, hexahydrophthalic, dodecenylsuccinic, pyromellitic acids or anhydrides or preferably methylnadic acid or anhydride, may specially be used as the compounds containing carboxy radicals (B).

Liquid polymers are preferably used, as the polybutadienes containing carboxy radicals (C), i.e. those having viscosities ranging from about 10 to 400 poises at room temperature, which greatly facilitates the admixing of the components and the processing of the formulations according to the invention.

Thus, preferred polybutadiene according to the invention has an average molecular weight by number of about 500 to 15,000, preferably of about 1,500 to 4,000, and a carboxylation number X of from 3 to 25, preferably from 4 to 12, where X is the number of carboxy groups in the acid or anhydride form per each 100 butadiene units.

Further, although polybutadienes of various microstructures may be used for preparing compositions according to the invention, preference is given to polymers containing more than 80% 1,4-cis units, on account of their greater fluidity and the fact that they provide the materials with better mechanical properties, particularly at low temperature.

Polybutadienes containing carboxy radicals may be prepared according to various known techniques, for example by copolymerization of 1,3-butadiene with an unsaturated carboxylic monomer, such as methacrylic acid, or by addition of maleic anhydride, thioglycolic acid or acetic acid to a butadiene polymer, the latter technique being the most appropriate for obtaining a stereoregular caboxylated polybutadiene.

The solid and flexible epoxide resins obtained by the process of the invention may further be cross-linked by means of at least one primary, secondary or tertiary amine such as, for example, methylene dianiline, m- phenylene diamine, triethylene tetramine, N-aminoethyl piperazine, benzyldimethylamine, N-methyl morpholine, 2,4,6-tris(dimethyl aminomethyl)phenol, dicyandiamide; polycarboxylic acids or anhydrides, for example, trimellitic acid or anhydride, cyclopentane tetracarboxylic dianhydride, benzophenonetetracarboxylic dianhydride; or Lewis acids such as, for example, boron trifuloride etherate, boron trifluoride monoethyl amine, triethanolamine borate and their mixtures.

When using cross-linking agents containing active hydrogen atoms or releasing active hydrogen atoms by heating, such as methylene diamine or benzyldimethyl amine, their proportion is so selected as to provide from 0.8 to 1.5 and preferably from 1 to 1.2 active hydrogen atom per epoxide group of the epoxide resin.

The new flexible epoxide resins according to the invention are particularly adapted to manufacturing flexible coatings, flexible pipes or ducts or coating agents for electric wires.

The following examples illustrate the invention but are not to be considered as limitative thereof.

EXAMPLES

Various solid epoxide resins, as modified according to the invention, are prepared from a basic formulation comprising 100 parts by weight of liquid epoxide resin resulting from condensing epichlorhydrin with 4,4-isopropylidene diphenol (EPIKOTE 828, as produced by Shell Chemical Corp.), 95 parts by weight of compounds having carboxylic acid or anhydride radicals and 2 parts by weight of benzyldimethylamine.

In formulation No. 1, the carboxylic compound is a mixture of 75% by weight of methylnadic anhydride and 25% by weight of a polybutadiene (70% of 1,2-units; $\overline{M}_n = 2,900$) carboxylated with thioglycolic acid (X=10).

In formulation No. 2, carboxylic polybutadiene is a polymer (84% 1,4-cis units; $\overline{M}_n = 2,000$) carboxylated with maleic anhydride (X=6), the remainder being the same as in formulation No. 1.

Formulation No. 3 comprises the same polybutadiene as used in formulation No. 2, but the mixture of the carboxylic compounds comprises 62% by weight of methylnadic anhydride and 38% by weight of maleinized polybutadiene.

In formulation No. 4, the mixture of carboxylic compounds contains 75% by weight of methylnadic anhydride and 25% by weight of polybutadiene (90% of 1,4-cis units and $\overline{M}_n = 1,700$) carboxylated with acetic acid (X = 11), while in formulation No. 5 (comparative), the mixture consists of 50% by weight of methylnadic anhydride and 50% by weight of the same carboxylic polybutadiene as used in formulation No. 4.

Formulations No. 6 to 10 are also used for comparison and are not within the scope of the invention.

The only carboxylic compound is methylnadic anhydride in formulation No. 6 and dodecenylsuccinic anhydride in formulation No. 7, the latter compound being known, according to the prior technique, as improving flexibility of epoxide resins.

5 parts of 2,3-epoxyoctane, as a reactive plasticizer, has been added to formulation No. 8, other things being equal to formulation No. 6.

In formulation No. 9, the mixture of caboxylic compounds contains 80% by weight of methylnadic anhydride and 20% by weight of telechelic polybutadiene (70% of 1,4-trans units, $\overline{M}_n = 3,300$) comprising essentially terminal carboxylic groups (X = 2.3).

Finally formulation No. 10 is similar to formulation No. 6, although it further contains 10% by weight of uncarboxylated polybutadiene (93% of 1,4-cis units, $M_n = 1,500$, X=0).

The various ingredients used in formulations No. 1 to 10 are carefully mixed at room temperature: the resulting fluid mixture is then poured into a mold and heated to 100° C for 2 hours; the resin is then post-treated at 200° C for 2 hours. The resulting hardened resin may then be taken from the mold and cut ot obtain the samples necessary to determine the mechanical properties summarized in table I.

Formulation No. 9 is turbid, probably due to poor compatibility between the telechelic polybutadiene and the epoxide resin; formulation No. 10 did not result in representative samples since complete phase separation occured during heating, also probably due to poor compatibility of uncarboxylated polybutadiene with the epoxide resin.

Flexion test have been carried out on an Instron machine of the 1115 type, according to ISO R 178 standard.

Determinations of torsion modulus as a function of termperature have been carried out with the apparatus defined by S.C. Gehman, D.E. Woodford and C.S. Wilkinson in Industrial and Engineering Chemistry 39, 1108 (1947) according to the ASTM D 1053 Standard. The rate of temperature increase was 2° C per minute.

When considering the values of the flexion or torsion elasticity modulus, as given in table I, it may be observed that the resin compositions according to the invention result in less stiff materials, although this flexibilization does not result in a substantial decrease of thermal stability; in fact, the deflexion temperatures of the formulations No. 1 to 4 according to the invention are higher than those of the formulations No. 7 to 9 flexibilized according to prior art techniques.

Besides, it can be observed that formulation No. 5, as obtained with 50% by weight of polybutadiene having a carboxylation number X = 11 in the hardening mixture, results in a substantial and simultaneous decrease of the flexion and torsion elasticity modulus, of hardness and also of heat stability.

Therefore, it appears that the improvements resulting from using compositions according to the invention are linked not only to the nature of the flexibilization agent, i.e. polybutadiene having a carboxylation number X higher then 3, but also to its proportion in the acid or anhydride hardening agent, which may be lower than 15% and preferably in the range of 4 to 10% of the carboxylic equivalents.

Finally, it can be mentioned that addition of carboxylated polybutadiene to the epoxide resins according to the invention results in an improvement of resistance to hydrolysis, both in acidic and basic media; it reduces water permeability and confers to the materials better electric insulation, their high volumetric resistivity ($10^{14}$ to $10^{16}$ohm/cm) and low dielectic constant (2.2 to 2.6) and waste factor (0.006 to 0.015) being more stable as a function of frequency, temperature and humidity conditions.

TABLE I

| Properties | Formulations No. | According to the invention | | | | Comparatives | | | | |
|---|---|---|---|---|---|---|---|---|---|---|
| | | 1 | 2 | 3 | 4 | 5 | 6 | 7 | 8 | 9 |
| Flexion elasticity modulus (Kg f/cm$^2$)10$^{-4}$ | | 1.6 | 1.9 | 0.9 | 2.5 | 1.2 | 3.3 | 2.5 | 2.7 | 2.3 |
| Resistance to break under flexion (kg f/cm$^2$) | | 600 | 840 | 410 | 950 | 270 | 1500 | 930 | 550 | 880 |
| Lengthening at break of the external fibre (%) | | 4.4 | 4.7 | 5.0 | 4.2 | 4.8 | 5.9 | 4.5 | 3.4 | 7.4 |
| Elasticity modulus under torsion (Kg f/cm$^2$)10$^{-3}$ | | | | | | | | | | |
| at 20° C | | 4.0 | 8.0 | 2.9 | 7.0 | 4.4 | 9.0 | 8.0 | 5.4 | 6.8 |
| at 50° C | | 2.8 | 8.0 | 2.3 | 6.2 | 0.9 | 8.0 | 7.0 | 3.3 | 5.4 |
| at 80° C | | 1.4 | 7.0 | 2.2 | 4.0 | 0.01 | 7.5 | 1.5 | 0.6 | 0.9 |
| at 100° C | | 0.08 | 5.0 | 1.1 | 0.8 | — | 6.5 | 0.04 | — | — |
| Deflexion temperature ° C | | 84 | 117 | 96 | 102 | 55 | 142 | 80 | 58 | 69 |
| Hardness (Shore D) | | — | 85 | 80 | — | 62 | 90 | 83 | 77 | — |

What we claim is:

1. In a process for manufacturing a solid epoxy resin composition by reacting under heating a liquid epoxy resin having more than one 1,2-epoxy group per molecule, with a polycarboxy hardener having carboxylic functions selected from the group consisting of a carboxylic acid function and a carboxylic acid anhydride function, the proportion of said liquid epoxy resin to said polycarboxy hardener being of from 0.5 to 1.5 epoxy group per carboxy equivalent, the improvement wherein said polycarboxy hardener consists essentially of a proportion of 98 to 85% with respect to the total carboxy equivalents of methylnadic anhydride and a proportion of 2 to 15% with respect to the total carboxy equivalents, of at least one polybutadiene containing carboxylic functions statistically distributed along the chain resulting from the addition of a proportion of 3–25 carboxy equivalents per each 100 butadiene units, of a carboxylic compound selected from the group consisting of maleic anhydride, thioglycolic acid and acetic acid, to a polybutadiene having a number average molecular weight of from 500 to 15,000 and containing more than 80% of cis - 1,4 units.

2. A process according to claim 1, wherein the liquid epoxide resin is reacted with the mixture of the carboxylic compounds and at a temperature of from 90 to 250° C for at least 30 minutes.

3. A process according to claim 1, wherein the mixture of the components is heated first to 100° C for at least one hour and then to 200° C for at least 1 hour.

4. A process according to claim 1, wherein the polybutadiene containing carboxylic functions is used in a proportion of 4–10% with respect to the total carboxy equivalents.

5. A process according to claim 1, wherein the epoxide resin is a di-glycidyl ether of bis-phenol A.

6. A process according to claim 1, wherein the polybutadiene containing carboxylic functions has a number average molecular weight of about 1500 to 4,000.

7. A process according to claim 1, wherein the polybutadiene containing carboxylic functions contains 4–12 carboxy equivalents per each 100 butadiene units.

8. A solid epoxy resin composition obtained by a process as claimed in claim 1.

9. A solid epoxy resin composition obtained by a process as claimed in claim 1, in which said liquid epoxy resin is one resulting from condensing epichlorhydrin with 4,4-isopropylidene diphenol, said polycarboxylic hardener consists essentially of 62% by weight of methylnadic anhydride and 38% by weight of a carboxylated polybutadiene resulting from the addition of maleic anhydride, in a proportion of 6 carboxy equivalents per 100 putadiene units, to a polybutadiene having a number average molecular weight of 2,000 and containing 84% of cis-1,4 units.

10. An epoxide resin composition according to claim 8, whose flexion elasticity modulus is equal to or lower than 2.5 × 10$^4$ Kg f/cm$^2$ and deflexion temperature is higher than 80° C.

* * * * *